United States Patent [19]

Wales et al.

[11] 4,289,803

[45] Sep. 15, 1981

[54] FOUNDRY MOLD TREATING COMPOSITIONS AND METHODS OF MAKING SAME

[75] Inventors: Wayne F. Wales, Clifton Park; James J. Frawley, Loudonville, both of N.Y.

[73] Assignee: General Electric Company, Schenectady, N.Y.

[21] Appl. No.: 158,065

[22] Filed: Jun. 9, 1980

Related U.S. Application Data

[63] Continuation-in-part of Ser. No. 68,193, Aug. 20, 1979, abandoned.

[51] Int. Cl.³ .......................... B28B 7/38; B29C 1/04
[52] U.S. Cl. ................................. 427/134; 106/38.22;
 106/38.27; 106/38.3; 106/38.35; 106/287.12;
 106/287.16; 106/287.29; 164/15; 164/33;
 423/304; 423/325; 427/337; 427/344
[58] Field of Search ............... 106/38.22, 38.27, 38.3,
 106/38.35, 287.12, 287.16, 287.29; 427/134,
 337, 344; 164/15, 33; 423/304, 314, 318, 325

[56] References Cited

U.S. PATENT DOCUMENTS

| | | | |
|---|---|---|---|
| 2,842,445 | 7/1958 | Emblem et al. | 106/38.35 |
| 3,211,560 | 10/1965 | Fair | 106/38.32 |
| 3,576,652 | 4/1971 | Teicher et al. | 106/38.35 |
| 3,682,668 | 8/1972 | Fujita et al. | 106/74 |
| 3,957,715 | 5/1976 | Lirones et al. | 260/375 B |
| 3,961,968 | 6/1976 | Wales | 106/38.35 |
| 4,111,705 | 9/1978 | Junovich et al. | 106/38.35 |
| 4,113,499 | 9/1978 | Ivanov | 106/38.35 |

OTHER PUBLICATIONS

Wales, Foundry, Mar. 1974, pp. 46–48, New Investment Binder Gels on Command.

*Primary Examiner*—Lorenzo B. Hayes
*Attorney, Agent, or Firm*—Ormand R. Austin; John F. Ahern

[57] ABSTRACT

Phosphosilicate compositions are disclosed for treating foundry molds and like products to enhance mold strength and refractoriness. The phosphosilicates, characterized more specifically as silicyl metaphosphates, may be used in combination with select refractory aggregates and other additives to form mold surface treating compositions, or may be combined directly with foundry sand or other comminuted refractory material for compacting into a mold form.

22 Claims, 1 Drawing Figure

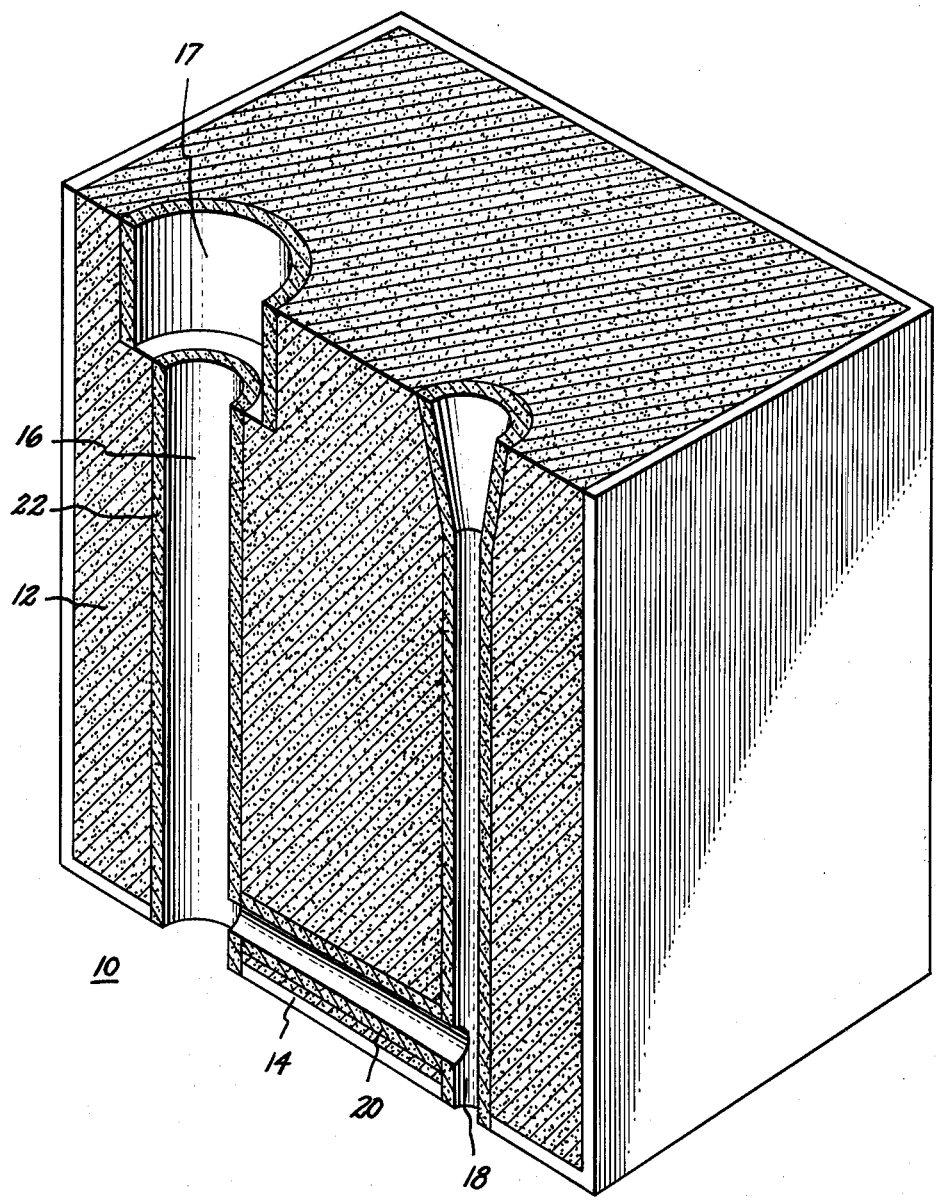

FOUNDRY MOLD TREATING COMPOSITIONS AND METHODS OF MAKING SAME

This application is a continuation-in-part of application Ser. No. 068,193 filed Aug. 20, 1979 abandoned.

BACKGROUND OF THE INVENTION

The present invention relates to foundry molds and the like and to compositions and methods for treating and manufacturing such foundry products. More particularly, the present invention relates to improved foundry molds and to novel coatings, impregnates and binding compositions, and methods of treating and preparing foundry molds, investment molds, furnace and ladle refractories, ceramic cores and like foundry products to enhance their high-temperature strength and refractoriness.

Various forms of silicate-containing compositions such as those disclosed in U.S. Pat. Nos. 4,113,499; 4,111,705; 3,961,968; 3,957,715; 3,682,668; 3,576,652; 3,211,560; and 2,842,445, are known for treating foundry molds and other such products. These silicate-containing compositions are incorporated either as a binder of the refractory material used in making the mold or as an impregnate or coating of the mold made from such material. Commonly, other ingredients are included with the silicate-containing composition to produce a treating mixture generally effective for its intended purpose. Some prior art compositions have been directed to the manufacture of air-setting or no-bake molds to eliminate the need for heat curing. However, these prior art compositions frequently produce air-setting molds having skins or treated surfaces of insufficient strength to withstand molten metal conditions encountered in foundry operations. For example, molds treated with prior art compositions do not always provide skins effective to withstand the intense heat and erosion due to agitation of the hot, turbulent metal which is poured into the mold cavity. Other treating compositions have produced skin structures prone to cracking when highly heated. Still others permit undesirable metal penetration into the sand of the mold, adverse chemical reactions, and spalling of the cavity surface.

Accordingly, a primary object of the present invention is to provide new and improved foundry products having superior treated surfaces for resisting intense heat, erosion, metal penetration and spalling when exposed to turbulent hot metal during foundry operations.

Another object of the present invention is to provide new and improved compositions for treating foundry molds and like products to enhance their strength and refractoriness.

Another object of the present invention is to provide new and improved foundry mold treating compositions which can be used either as mold coatings, as binders for the mold material, or as impregnates to enhance bond strength and refractoriness of treated mold surfaces.

Another object of the present invention is to provide mold coating compositions and methods of making molds which produce coatings on the surfaces of mold cavities of substantial thickness and of high bond strength and refractoriness.

Other objects, features, and advantages of the present invention will become apparent from the subsequent description and the appended drawing in which the sole FIGURE is a vertical cross section, with parts broken away, of a typical casting mold utilizing the improvements constituting the invention.

SUMMARY OF THE INVENTION

The above-stated objects and other benefits and features are obtained in foundry molds, investment molds, furnace and ladle refractories, ceramic cores and other like foundry products by treating them with a phosphosilicate composition whose structure, preparation, and use will hereinafter be described. The phosphosilicate of the invention may also be referred to herein as a silicyl metaphosphate and may be prepared by admixing colloidal silica sol, a water miscible organic solvent, an alkyl silicate, and a quantity of concentrated phosphoric acid in excess of that required to catalyze a hydrolysis reaction of alkyl silicate. In other forms of the invention, the phosphosilicate compound may be combined with various additives to increase its effectiveness in certain uses. For example, the phosphosilicate compound may be mixed with a refractory aggregate to provide a highly effective, slurry-like mixture for treating mold surfaces. Other additives include those chosen to impart greater green strength and hardness to the treated product, and surfactants to improve wetting characteristics.

A treating composition prepared according to the invention is applied to the surface of the foundry mold, core, or like product to be treated by either daubing, painting, spraying, or by any other suitable procedure. The treated mold or product is then allowed to dry in air for a short period as it acquires a skin, or coating, or approximately 15 to 30 mils thickness and a total effective penetration depth of about 2 inches. Alternatively, the phosphosilicate treating composition may be mixed with the foundry sand or other comminuted refractory material during the mixing of the sand to prepare it for compacting into a mold form. When so used, the silicyl metaphosphate can be employed in an amount suitable to obtain a desired mix consistency. A compacted mold formed with such a binder is characterized by having greater binder strength and refractoriness than a corresponding foundry product not so treated.

DETAILED DESCRIPTION OF THE INVENTION

In general, a mold treating phosphosilicate composition according to the present invention is prepared as an admixture of a water miscible organic solvent, a colloidal silica sol, an alkyl silicate, and concentrated phosphoric acid. In some embodiments of the invention, a starting material, referred to herein and in some published prior art as a "hybrid silicate", is first prepared. The term "hybrid silicate" is deemed appropriate for identifying those products obtained from admixing an alkyl silicate with colloidal silica sol under certain conditions to produce mold binding compositions since both alkyl silicate and colloidal silica sol are well known in the art for their separate use as mold binders or mold treating compositions. An example of a hybrid silicate useful as a starting material in the present invention is that taught in U.S. Pat. 3,961,968. However, the term "hybrid silicate" as used or referred to herein is not intended to be limited to those compositions taught and so termed by the above mentioned patent.

The phosphosilicate of the present invention, more specifically referred to herein as silicyl metaphosphate, is characterized by the structural formula set forth hereinafter, and is prepared, for example, from the following ingredients:

(a) an alkyl silicate, preferably ethyl silicate having 28% to 40% by weight $SiO_2$. Commercially, Ethyl Silicate 40 ES, available from Stauffer Chemical Company or Remet Corporation may be used as the alkyl silicate with satisfactory results. Examples of other alkyl silicates which may be used include ethyl polysilicate, ethylene glycol monoethyl ether silicate, propylsilicate, butylsilicate, and methyl polysilicate.

(b) an aqueous or alcohol based colloidal silica sol, preferably having 15% to 50% by weight $SiO_2$ (pH can be acidic or basic).

(c) a water-miscible organic solvent to serve as a mutual solvent for the alkyl silicate and the colloidal silica. Examples of suitable solvents include water-miscible alcohols having from 1 to 4 carbon atoms, and glycol ether having the formula $C_nH_{(2n+1)}OCH_2CH_2OH$ wherein n equals 1, 2, 3, or 4. Preferred alcohols are ethyl alcohol and isopropyl alcohol.

(d) phosphoric acid having a concentration of 50-90%.

The silicyl metaphosphate, formed from an admixture of the above listed ingredients, may be further combined with a refractory aggregate, as has been previously mentioned, to produce a slurry-like mixture for treating mold surfaces. Such a slurry has been found to greatly increase the ability of a mold surface to resist the deleterious effects of hot molten metal. Preferably the refractory aggregate is selected from a group consisting of zircon, silica, alumina-silicates, graphite, fused silica, alumina, chromite, fibrous alumina silicates, magnesia, or combinations thereof. Most preferably, such refractory aggregates have a particle size diameter distribution of between, approximately, 10 and 3,000 microns.

A surfactant can also be included for wetting the refractory aggregate during preparation of the coating composition. Suitable surfactants include the common sodium soaps of fatty acids, carboxymethyl cellulose, sodium sulfates, sodium tripolyphosphates, and synthetic detergents. Commercially available surfactants include Victawet, available from Stauffer Chemical Company; Wetsit, available from Nopco Chemical Company; and Lestoil, available from Noxell Corporation. Suitable fatty acid surfactants include Wetanol, available from Clyco Chemicals, Inc.; Surfact, a product of Casting Supply House of New York; and Westasep, obtainable from West Chemical Products, Inc. The preferred synthetics are straight-chain compounds having ten or more carbon atoms in the chain.

By specific example, silicyl metaphosphate according to the invention can be prepared by utilizing the ingredients and following the procedures set forth in the examples which follow.

EXAMPLE 1

| Ingredients | Approximate Weight Percentages |
|---|---|
| Sulfuric Acid, Concentrated | 0.25 |
| Water (Distilled, Deionized) | 0.99 |
| Colloidal Silica Sol (Acidic) | 49.05 |
| Ethylene Glycol Monoethyl Ether | 30.01 |
| Phosphoric Acid (85%) | 11.60 |
| Ethyl Silicate 40 | 8.10 |

In a water-cooled reaction chamber 0.25 percent concentrated $H_2SO_4$ was combined with 0.99 percent distilled and deionized water. With agitation, 22.50 percent ethylene glycol monoethyl ether was charged into the reaction chamber followed immediately by 8.10 percent Ethyl Silicate 40, available from either Stauffer Chemical Company or Remet Corporation. The mixture was then agitated for 30 minutes at a carefully maintained temperature of between 20° C.-27° C. After the 30-minute period, this admixture was maintained between 20° C.-27° C. for 48 hours at which time 49.05 percent acidic colloidal silica sol was gradually introduced into the reaction chamber and the mixture agitated for an additional two hours while maintaining the temperature of the reaction mixture at 20° C.-27° C. When the above reaction was near completion, a mixture of 11.60 percent concentrated phosphoric acid and 7.51 percent glycol ether was then introduced and reacted for the 30 minutes. The final product was allowed to cool to ambient temperature and stored until used in making the coating composition.

EXAMPLE 2

| Ingredients | Approximate Weight Percentages |
|---|---|
| Hydrochloric Acid (37%) | 0.15 |
| Ethyl Silicate 40 | 27.42 |
| Colloidal Silica Sol (Alkaline or Acidic) | 10.63 |
| Isopropyl Alcohol (Anhydrous) | 41.83 |
| Phosphoric Acid (85%) | 19.94 |

The composition derived from the above-indicated ingredients was prepared according to the following procedure. In a reaction vessel having a cooling means, 0.15 percent concentrated hydrochloric acid (37%) was carefully mixed with 10.63 percent alkaline colloidal silica. While stirring, 20.92 percent isopropyl alcohol was charged into the reactor vessel and mixed for 10 minutes. Subsequently, a premix of 20.92 percent isopropyl alcohol and 19.94 percent phosphoric acid was added to the reactor vessel and the reaction mixture was stirred for 30 minutes. The resulting mixture was then maintained at a temperature between 20° C.-27° C. for 24 hours. After the 24-hour period, 27.42 percent Ethyl Silicate 40 was gradually added to the reactor vessel while maintaining the temperature between 20° C.-27° C. The contents of the reactor vessel was thoroughly mixed for one hour, maintained between 20° C.-27° C. for 24 hours, and then stored for use in making the coating composition.

EXAMPLE 3

| Ingredient | Approximate Weight Percentages |
|---|---|
| Sulfuric or Hydrochloric Acid | 0.15 |
| Water (Distilled, Deionized) | 0.99 |
| Glycol Ether | 20.10 |
| Ethanol or Isopropyl Alcohol | 2.46 |
| Alkyl Silicate | 57.50 |
| Colloidal Silica Sol | 9.10 |
| Phosphoric Acid, Concentrated | 10.10 |

EXAMPLE 4

| Ingredient | Approximate Weight Percentages |
| --- | --- |
| Sulfuric Acid, Concentrated | 0.25 |
| Glycol Ether | 3.51 |
| Ethanol or Isopropyl Alcohol | 24.10 |
| Alkyl Silicate | 34.27 |
| Colloidal Silica Sol | 13.27 |
| Phosphoric Acid, Concentrated | 24.60 |

EXAMPLE 5

| Ingredient | Approximate Weight Percentages |
| --- | --- |
| Sulfuric Acid, Concentrated | 0.15 |
| Glycol Ether | 25.20 |
| Alkyl Silicate | 16.10 |
| Colloidal Silica Sol | 53.00 |
| Phosphoric Acid, Concentrated | 5.50 |

Mold treating compositions formulated from the above listed ingredients and concentrations are prepared by using a water cooled reaction chamber in which the concentrated acid (sulfuric or hydrochloric) and water (if called for) are combined with Glycol Ether and/or alcohol. This solution is agitated for 5 minutes and the alkyl silicate is then added while agitation continues. After 30 minutes of mixing, the admixture is held for 48 hours at 20° C. to 27° C. The colloidal silica sol is added after the expiration of this time period and the resulting mix is vigorously agitated for 2 hours, after which time the hydrolysis reaction is nearly complete. At this time the phosphoric acid is added as vigorous agitation of the mixture continues. It is important that temperature be carefully controlled between 20° C. and 27° C. during the period of silica sol and phosphoric acid addition.

EXAMPLE 6

| Ingredient | Approximate Weight Percentages |
| --- | --- |
| Sulfuric Acid, Concentrated | 0.05 |
| Glycol Ether | 5.00 |
| Alkyl Silicate | 2.00 |
| Colloidal Silica Sol | 33.10 |
| Ethanol | 15.05 |
| Phosphoric Acid, Concentrated | 44.80 |

A phosphosilicate according to the above composition was prepared according to the following procedure. In a water cooled reaction chamber, the ethanol was added to the phosphoric acid and mixed for five minutes. This solution was then cooled and held at between 20° C. and 27° C. In a separate container at room temperature, the sulfuric acid and glycol ether was combined with the alkyl silicate. This solution was agitated for five minutes and then combined with the colloidal silica sol. After 15 minutes mixing, the mixture was added to the water cooled reaction chamber containing the phosphoric acid solution. The contents were mixed vigorously while the temperature was controlled between 25° C. and 27° C. for a reaction period of two hours. The product was then kept in the water cooled reaction chamber under controlled temperature conditions for eight hours.

Example 6 may also be prepared using either isopropyl alcohol or water instead of ethanol.

The silicyl metaphosphate prepared according to the present invention, and more specifically according to the methods described above, has the formula:

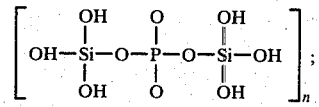

where n = 1, 2, 3 or 4.

A coating composition can be prepared in which the silicyl metaphosphate of the present invention is combined with a refractory aggregate or combination of aggregates to form a coating slurry. Preferred aggregates include those which have been listed above. Additionally, the slurry can include a predetermined quantity of an additive selected from the group consisting of polyvinyl acetate, polyvinyl alcohol, and clay for green strength hardness. A surfactant can also be included for wetting the aggregates during preparation of the coating composition. Suitable surfactants are as noted above.

The coating just described can include the following particular ingredients and can be prepared according to the procedure indicated below:

| Ingredient | Approximate Weight Percentages |
| --- | --- |
| Refractory Aggregate | 75-90 |
| Polyvinyl Acetate or Polyvinyl Alcohol | 0.5 |
| Silicyl Metaphosphate (from examples above) | 10-25 |
| Surfactant | 0.1 |

In a reactor vessel having cooling means to maintain the reaction mixture at all times below 30° C., and while stirring, 40.9% of the refractory aggregate was added to 18.5% silicyl metaphosphate and mixed for 15 minutes. Agitation was stopped and 0.5% polyvinyl acetate was gradually introduced into the vessel. The resulting mixture was stirred for 5 minutes and 0.1% surfactant was added. Mixing was then continued for an additional 5 minutes. To the composition, next was added the balance of the refractory aggregate and the resultant mixture was blended for 15 minutes. After thorough mixing, the product was allowed to cool to room temperature.

The silicyl metaphosphate based coating composition prepared in the manner just described is in the form of a slurry and is applied to the surface of the foundry mold, core, or like product to be treated. Application is made in any suitable manner, but more specifically, and by way of example, the product to be treated may be a foundry mold as illustrated generally at 10 in the drawing showing a compact of a silica sand 12 or other comminuted refractory material commonly used in foundry operations contained in a mold flask 14. When the product to be treated is a foundry mold, at least the surface of the metal-receiving cavity 16 and any portions of the mold surrounding the cavity as well as the mold gate 18 and runner 20 are coated with the described composition by either daubing, painting, spraying, or by any other suitable application procedure. The coated mold is then permitted to dry in air for approximately 20 minutes to produce a mold having a skin thickness, or coating, 22 of approximately 15 mils to 30 mils on the treated surface and a total impregnation depth of up to approximately 2 inches. This significantly enhances the bonding strength of the mold. Alternatively, the drying period may be shortened by heating the mold coating with hot air, torch, or other suitable means. In either case, the treated molds have an improved surface quality demonstrating substantial resistance to penetration by turbulent molten metal, spalling, and erosion. In addition, the treated mold exhibits a degree of refractoriness substantially greater than a corresponding untreated mold. Indeed, the green strength of foundry molds and like products so treated has been increased by 3 times. When molds so treated have been heated, the mold strength has been increased by over 10 times and found to resist temperatures over 3,000 degrees F., without distortions due to high temperature softening.

In addition to utilizing the silicyl metaphosphate in combination with an aggregate as a coating, the silicyl metaphosphate prepared according to the formulations disclosed above can be used independently as an impregnate applied to the surface of the foundry mold, core, or like product to be treated. Application of the silicyl metaphosphate to the surface to be treated is accomplished by the methods previously described for coating compositions, or by any other suitable means of application. Upon application, the silicyl metaphosphate affects the surface of the cavity or area treated in two ways: firstly, a coating is imparted to the surface so treated and provides a skin, or coating, of approximately 1 to 3 mils thereon, and secondly, the silicyl metaphosphate penetrates beneath the surface so treated to a depth of, approximately, 2 inches. Thus thusly treated foundry mold, core or like product, after air drying for approximately 20 minutes, exhibits characteristics similar to those of a surface treated with the silicyl metaphosphate/refractory aggregate coating.

Another important aspect of the silicyl metaphosphate of the present invention is its inertness to molten steel. That is, it inhibits any adverse chemical reactions between the constituents of molds and like products impregnated with it and between certain ingredients in the molten metal such as titanium and aluminum in steels which may be undesirably oxidized. The silicyl metaphosphate also improves the radiographic quality of the casting by reducing the amount of mold materials spalling and becoming embedded in the cast product during the casting operation.

Still another embodiment of the present invention can be used to apply a silicyl metaphosphate impregnate to a foundry mold, core or like product and is effective for obtaining a product having all the characteristics of a product impregnated with a silicyl metaphosphate as heretofore described. This alternative embodiment comprises a two-step procedure to avoid possible shelf-life deficiencies in a performulated silicyl metaphosphate impregnate. By means of this procedure, a silicyl metaphosphate is formed simultaneously on the surface treated, upon application to a hybrid silicate first applied to the surface to be treated, of a solution of a high concentrate phosphoric acid and alcohol as indicated below:

| Ingredient | Approximate Weight Percentages |
| --- | --- |
| Phosphoric Acid, Concentrated | 50–90 |
| Ethanol or Isopropyl Alcohol | 10–50 |

For impregnating a foundry mold according to this embodiment of the invention, the foundry mold is first treated with a hybrid silicate formulation prepared from the following ingredients and according to the following procedure.

| Ingredient | Approximate Weight Percentages |
| --- | --- |
| Alkyl Silicate | 7–9 |
| Colloidal Silica Sol | 45–55 |
| Water | 0.5–1 |
| Glycol Ether | 35–45 |
| Sulfuric Acid, Concentrated | 0.25 |
| Ethanol or Isopropyl Alcohol | 5 |

In preparing a hybrid silicate according to the above formulation of ingredients, a reactor vessel having cooling means to maintain reaction mixture at a temperature between 20° C. and 27° C. was charged with a premix of 0.25% concentrated sulfuric acid, 0.75% water and 5% isopropyl alcohol. With agitation, 40% ethylene glycol monethyl either followed by 8% alkyl silicate (Ethyl Silicate 40), available from Stauffer Chemical Company, was added to the above mixture and the mixing was continued for 30 minutes. The resultant mixture was allowed to rest for 48 hours and then 51% colloidal silica sol was added while maintaining the mixture at a temperature between 20° C. and 27° C.

For treating a foundry mold according to this embodiment of the invention, the mold is first treated with a hybrid silicate formulated as described above. The hybrid silicate is applied by daubing, spraying, or by any other suitable means of application. After the surface of the foundry mold is thus treated, the mixture of phosphoric acid and isopropyl alcohol is then applied in like manner to the mold surface and the mold allowed to air-dry for approximately 20 minutes at which time it is ready for use.

It is to be understood from the foregoing that the above described silicyl metaphosphate has application to the treating and manufacture of foundry molds and like products as a binding composition or impregnate alone and without the addition of a refractory aggregate. More specifically, the silicyl metaphosphate can be used as a binder admixed with the foundry sand or other comminuted refractory material during the mixing of the sand to prepare it for compacting into a mold form. When so used, the silicyl metaphosphate can be employed in an amount suitable to obtain a desired mix consistency. When silicyl metaphosphate, as prepared according to Examples 1 and 2 above, is utilized in this manner, the binder composition can be chemically gelled by including up to about 1% by weight of an amine compound in the silicyl metaphosphate. For example, about 1% by weight of ammonium hydroxide or ammonium carbonate can be added to catalyze the gelling reaction and produce a so-called "command hardening" of the binder. A compacted mold formed with any binder set forth in the above examples is characterized by having greater binder strength and refractoriness then a corresponding foundry product not so treated. Additionally, the treated product exhibits all the characteristics of the molds and like products herein above described as having been surface treated utilizing the silicyl metaphosphate. These characteristics include quicker air drying, increased green strength, and resistance to temperatures above 3,000° F.

While specific embodiments of the present invention have been described, it is desired that the invention not be limited to the particular forms described, and it is intended by the appended claims to cover all modifications within the spirit and scope of the present invention.

What is claimed is:

1. A phosphosilicate composition useful for treating foundry molds and products, comprising an admixture of from about 5 to about 55 weight percent colloidal silica sol containing at least 15 percent $SiO_2$; from about 2 to about 60 weight percent of an alkyl silicate containing at least 28 percent $SiO_2$; from about 20 to about 40 weight percent of a water-miscible organic solvent, and from about 5 to about 45 weight percent phosphoric acid having a concentration of at least 50 percent.

2. A composition for treating foundry molds and products, comprising by weight:
   (a) from about 10 to about 25 percent of a phosphosilicate composition according to claim 1; and
   (b) the balance of refractory aggregate.

3. A composition according to claim 2 wherein the refractory aggregate is selected from the group consisting of zircon, silica, alumina-silicates, graphite, fused silica, alumina, chromite, fibrous alumina silicates, magnesia, and combinations thereof.

4. A composition for treating foundry molds and products, comprising by weight:
   (a) from about 10 to about 25 percent of a phosphosilicate composition according to claim 1;
   (b) up to about 3 percent of an additive selected from the group consisting of polyvinyl acetate and polyvinyl alcohol, and
   (c) the balance a refractory aggregate.

5. A composition for treating foundry molds and products, obtained by:
   (a) admixing from about 20 to about 40 weight percent of a water-miscible organic solvent; from about 5 to about 55 weight percent colloidal silica sol containing at least about 15 percent $SiO_2$; and from about 2 to about 60 weight percent of an alkyl silicate containing at least about 28 percent available $SiO_2$; and
   (b) reacting from about 5 to about 45 weight percent phosphoric acid having a concentration of about 50 to about 90 percent with the admixture obtained by step (a) to yield a phosphosilicate compound.

6. The composition of claim 5 wherein said alkyl silicate is selected from the group consisting of ethyl polysilicate, ethylene glycol monoethyl ether silicate, propyl silicate, butyl silicate, and methyl polysilicate.

7. The composition of claim 5 wherein said phosphosilicate compound is a silicyl metaphosphate having the formula:

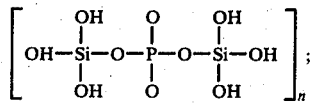

wherein n = 1, 2, 3, or 4.

8. A composition for treating foundry molds and products comprising an admixture of a phosphosilicate compound according to claim 5 and a refractory aggregate.

9. A composition for treating foundry molds and products comprising by weight:
   (a) from about 10 to about 25 percent of a phosphosilicate compound according to claim 5; and
   (b) the balance a refractory aggregate.

10. A composition according to claim 9, wherein the refractory aggregate is selected from the group consisting of zircon, silica, alumina-silicates, graphite, fused silica, alumina, chromite, magnesia, fibrous alumina silicates, and combinations thereof.

11. A method of making a foundry mold or products, comprising:
   mixing a comminuted refractory material with the phosphosilicate compound of claim 5 and forming the resultant mixture to a desired shape in a mold.

12. A method of treating foundry molds and products formed of compacted comminuted refractory materials, comprising coating at least a predetermined surface portion of said mold with the composition of claim 9, whereby said surface portion is coated with refractory aggregate and said phosphosilicate impregnates said surface portion.

13. A method of treating foundry molds and products formed of compacted comminuted refractory materials comprising coating at least a predetermined surface portion of said mold with the composition of claim 9, whereby said surface portion is coated with refractory aggregate to a depth of approximately 15 mils to 30 mils and said phosphosilicate impregnates said surface portion to a depth up to approximately two inches.

14. A composition for treating foundry molds and products, comprising by weight:
   (a) from about 10 to about 25 percent of a phosphosilicate compound according to claim 5;
   (b) up to about 3 percent of an additive selected from the group consisting of polyvinyl acetate and polyvinyl alcohol, and
   (c) the balance a refractory aggregate.

15. A composition according to claim 14 wherein the refractory aggregate is selected from the group consisting of zircon, silica, alumina-silicates, graphite, fused silica, alumina, chromite, magnesia fibrous alumina silicates, and combinations thereof.

16. A composition according to claim 15 wherein the refractory aggregate has a particle size diameter distribution of between about 10 and about 3,000 microns.

17. A method of treating foundry molds and products formed of compacted comminuted refractory materials, comprising coating at least a predetermined surface portion of the surface to be treated with a hybrid silicate followed by application to the surface so treated of a mixture of about 50–90 percent of a high concentrate phosphoric acid and approximately 10–50 percent water miscible alcohol to form a silicyl metaphosphate on the surface so treated.

18. The method of claim 17 wherein said hybrid silicate is the product of an admixture of from about 7 to about 9 weight percent alkyl silicate containing at least 28% available $SiO_2$, from about 45 to about 55 weight percent acidic colloidal silica sol containing at least 28% available $SiO_2$; from about 35 to about 45 weight percent glycol ether, and from about 4 to about 6 weight percent of a water-miscible alcohol.

19. A method of treating foundry molds and products, according to claim 18 wherein the alcohol of the mixture is ethanol or isopropanol.

20. A foundry mold or the like treated according to the method of claim 19 and wherein the silicyl metaphosphate formed on the surface so treated extends below said surface to a depth up to approximately two inches.

21. A composition for treating foundry molds and products, comprising the composition according to claim 1 and up to about 1 weight percent of an ammonium compound as a gelling catalyst selected from the group consisting of ammonium hydroxide and ammonium carbonate.

22. A method of making a foundry mold or products, comprising:

mixing a comminuted refractory material with the composition of claim 21 and forming the resultant mixture to a desired shape in a mold.

* * * * *